United States Patent [19]

Froment et al.

[11] Patent Number: 5,251,672
[45] Date of Patent: Oct. 12, 1993

[54] DRAWN LEVER LUBRICATION APPARATUS FOR A WEAVING MECHANISM

[75] Inventors: Jean P. Froment, Doussard; André Fumex, Talloires, both of France

[73] Assignee: S.A. des Etablissements Staubli (France), Faverges, France

[21] Appl. No.: 910,712

[22] Filed: Jul. 7, 1992

[30] Foreign Application Priority Data

Jul. 15, 1991 [FR] France ................... 91 09116

[51] Int. Cl.⁵ .................................. D03C 13/00
[52] U.S. Cl. ................................... 139/82; 139/66 A; 139/1 R; 384/473; 384/474
[58] Field of Search ............... 384/473, 474; 139/83, 139/84, 82, 66 A, 1 R, 75

[56] References Cited

U.S. PATENT DOCUMENTS 2,592,820  4/1952  Moessinger .................. 139/75 X
5,002,097  3/1991  Yokoi ............................. 139/82

FOREIGN PATENT DOCUMENTS 3021163  4/1981  Fed. Rep. of Germany ........ 139/82

Primary Examiner—Andrew M. Falik
Attorney, Agent, or Firm—Dowell & Dowell

[57] ABSTRACT

A drawing mechanism incorporating rocking levers interposed between a weaving mechanism and the heddle frames of a weaving loom wherein each of the rocking levers for coupling the connecting rods includes a lateral element which defines a lubrication conduit joining the interspace of the ball bearings to an opening made in the levers for mounting to a coupling pivot.

11 Claims, 8 Drawing Sheets

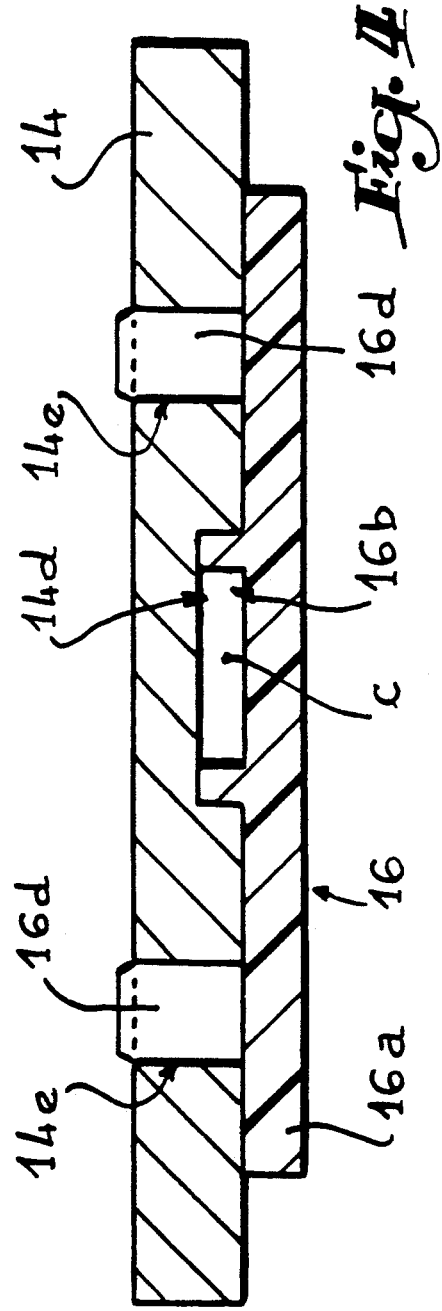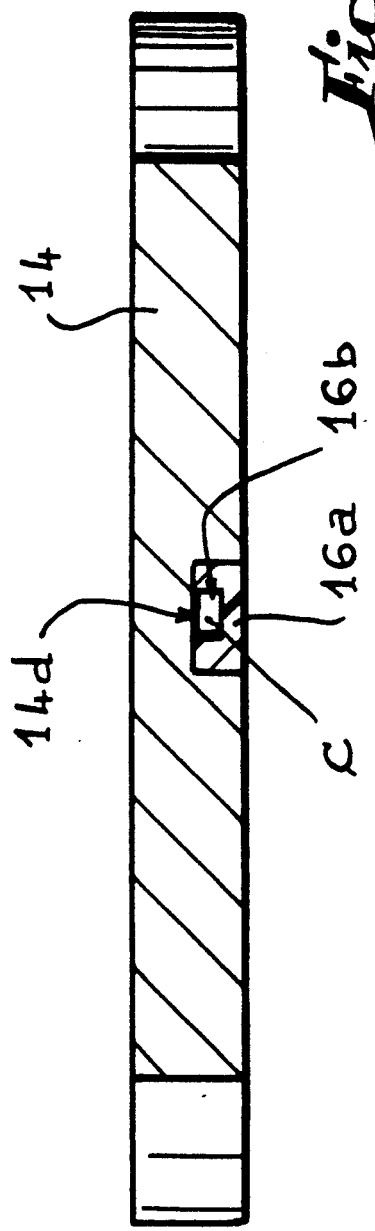

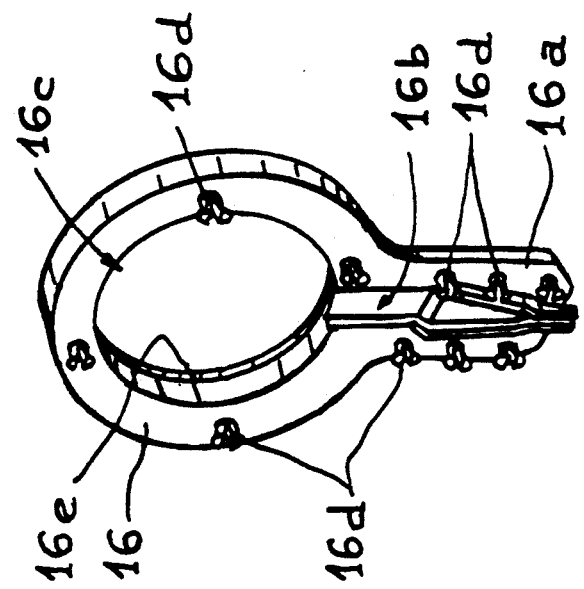
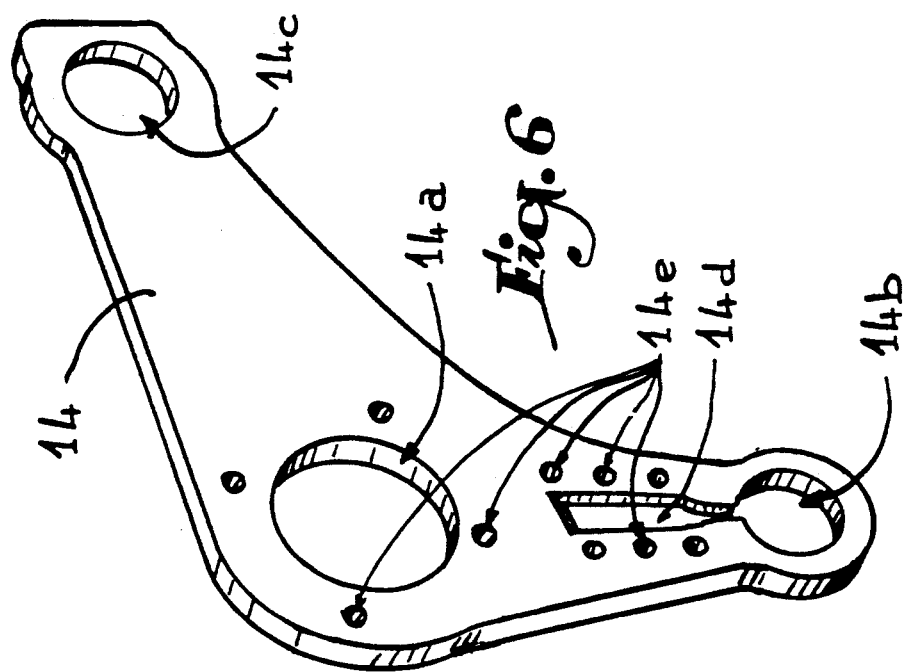

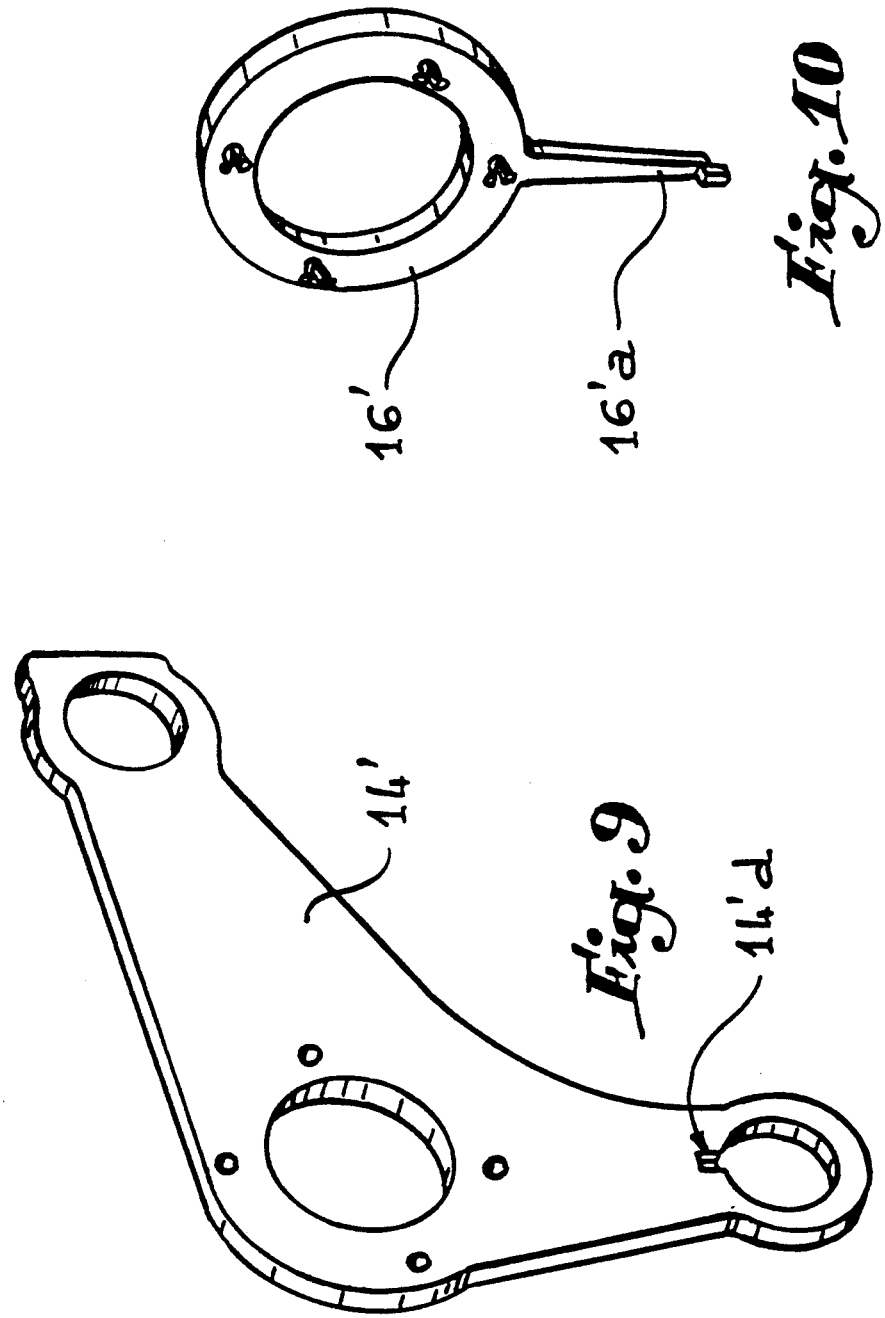

DRAWN LEVER LUBRICATION APPARATUS FOR A WEAVING MECHANISM

BACKGROUND OF THE INVENTION

1. Field of the Invention

The present invention relates to dobbies and other weaving mechanisms for forming the shed in weaving looms, and more particularly to drawing mechanisms of the rocking lever type which couple the moveable members for actuating such a mechanism with the vertically moveable heddle frames mounted on the loom.

2. History of the Related Art

In order to clarify matters, FIG. 1 of the accompanying drawings very schematically shows the general arrangement of a drawing mechanism of the type in question. In this Figure, reference 1a designates one of the members for actuating a dobby 1, while reference 2 designates one of the heddle frames mounted on the weaving loom. It may be ascertained that, in order to ensure the articulated connection between the elements 1a and 2, the drawing mechanism, at each frame 2, a series of connecting rods 3 oriented either horizontally, vertically or obliquely. The connecting rods 3 are coupled to one another with the aid of rocking levers 4 mounted side by side along fixed horizontal shafts 5.

The lubrication necessary for free pivoting of the levers 4 on their common shaft 5, as well as that of the ends of the connecting rods 3 on levers, has always raised serious problems, principally due to the fact that the elements to be lubricated are placed at ground level, below the heddle frames 2 and are consequently not easily accessible. Also they function in a dusty atmosphere, filled with textile flock. In order to avoid stopping the loom, lubrication is usually effected by spraying a mist of lubricant at each of the assemblies of levers 4 and it will be readily appreciated that, such a system is hardly satisfactory in practice, due to the nature of the quantity of grease and to the pollution of the environment.

It is a principal object of the present invention to overcome these drawbacks, with the aid of a lubricating system which is perfectly rational due to its punctual nature, said system not requiring that the loom be stopped for implementation thereof.

SUMMARY OF THE INVENTION

The invention essentially consists in associating with at least certain of the rocking levers a lateral element comprising a hollow part which surrounds the fixed pivot shaft for the levers in order to maintain a reserve of lubricant from which reserve lubricant originates at least one lubricating conduit sectioned out in. At least one of the moveable pivots for articulation of the connecting rods on the lever in question.

BRIEF DESCRIPTION OF THE DRAWINGS on reading the following drawings with reference to on reading the following drawings with reference to the accompanying drawings, in which:

FIG. 1, as indicated hereinabove, shows the type of prior art drawing mechanism to which the invention refers.

FIGS. 3, 4 and 5 are sections of details, on a larger scale, along the planes indicated respectively at III—III, IV—IV and V—V in FIG. 2.

FIGS. 6 and 7 are views in perspective showing the faces of a lever and of a lateral element which are intended to come into contact with each other.

FIGS. 9, 10 and 11 are views similar to those of FIGS. 6, 7 and 3, corresponding to a variant embodiment of the invention.

DETAILED DESCRIPTION OF THE DRAWINGS

Figure 1:
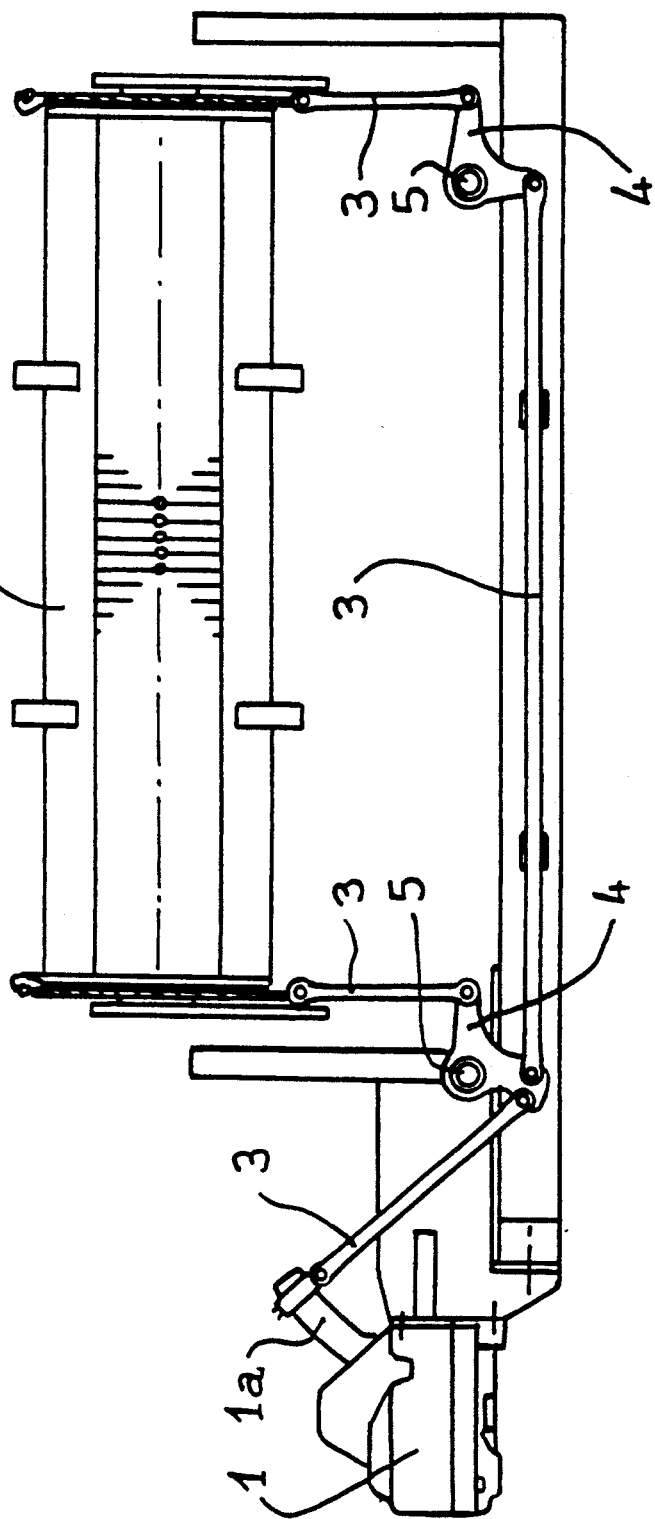
Figure 2:
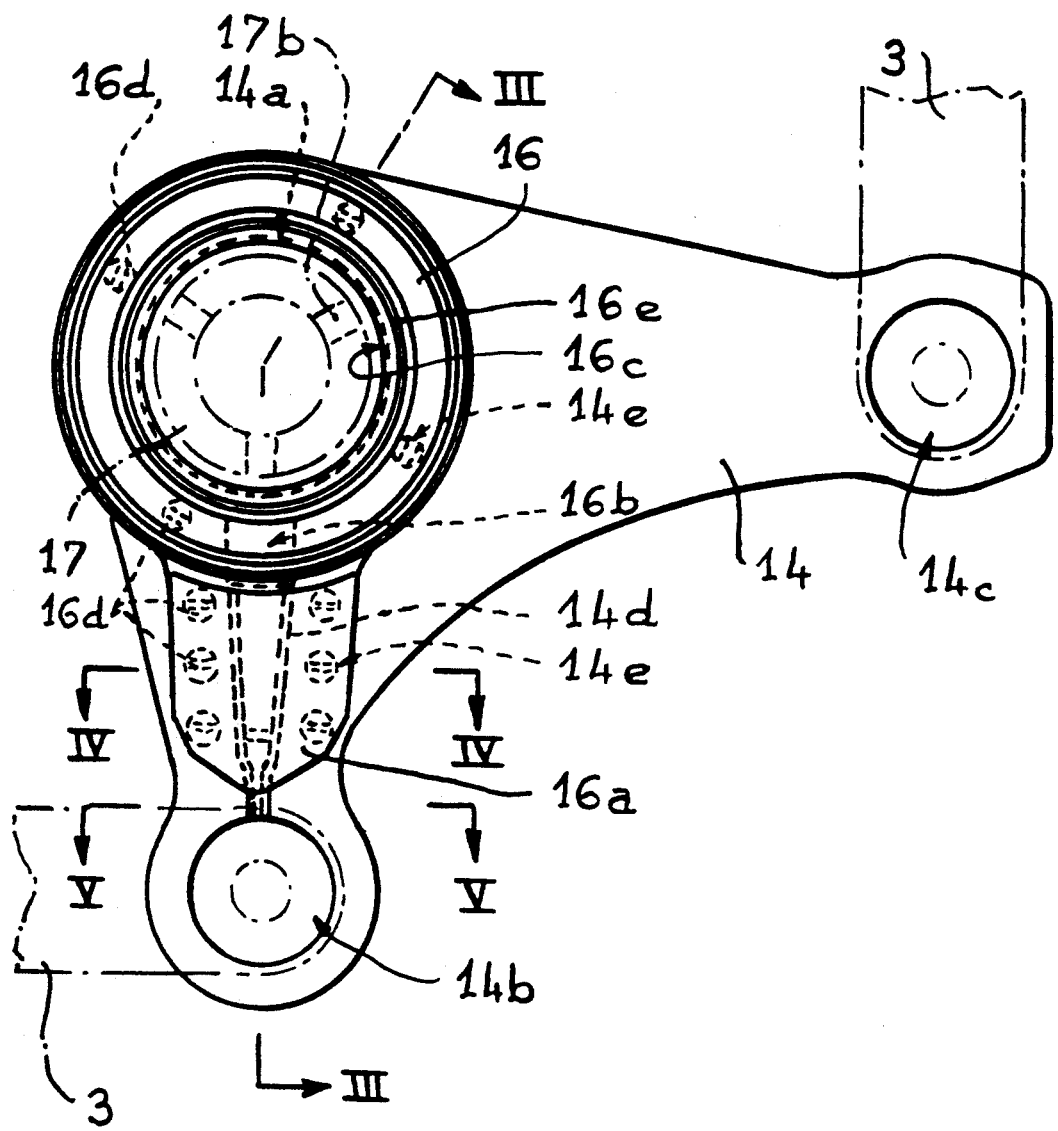
FIG. 2 is a side view of one of the rocking levers of a drawing mechanism according to the invention, the lever being equipped with a lateral element.

Referring again to the drawings, in FIGS. 2 to 8, reference 14 designates a metal lever comprising two extensions or arms defining a right-angled profile. As shown more particularly in FIG. 6, this lever 14 has a principal opening 14a and two secondary openings 14b and 14c cut therein, made at the end of the arms to allow coupling of the connecting rods 3. It will be observed that, along the line which joins the centers of openings 14a and 14b, one of the opposite faces of the lever 14 has an impression or recess 14d of rectilinear profile hollowed out therein, which extends from a point located at a certain distance from the opening 14a to open out in the opening 14b.

With each lever 14 is associated a lateral element 16, advantageously made of a moulded synthetic material. This lateral element 16 comprises a principal part of annular profile, extending from a rectilinear extension 16a. One of the faces of element 16 includes an extension 16a, a convex profile which defines a cavity, recess, or impression 16b opening out in opening 16c of the annular principal part of the lateral element and at the free end of the extension 16a.

The lateral element 16 thus arranged is intended to be assembled on the lever 14 described above, impression 16b coming into register with impression 14d. Assembly of the elements 14 and 16 may be obtained in any appropriate manner (riveting, adhesion, etc. . . . ); in the embodiment shown, it has been assumed that the lateral element 16 is provided with split studs 16d adapted to clip elastically inside holes 14e provided through the end of the lever 14.

Once the lateral element 16 is secured with the lever 14, it will be appreciated that these two pieces define between their opposite faces a conduit c which connects openings 14a and 14b to each other, the deformability of the synthetic material employed for making the lateral element 16 ensuring tightness of conduit.

The opening 14a of each complex 14–16 is intended to receive a roller bearing (FIGS. 2, 3 and 8) of which the rolling bodies 17a are retained between the profiled wall of the opening 14a mentioned above and the outer wall of a ring 17. It should be noted that one of the lateral walls of ring 17 has radial grooves 17b hollowed out therein, which open out in the opening of the ring 17 and on the periphery thereof.

The assembly of the complexes 14–16 equipped with their roller bearing 17-17a is mounted between two washers 18 (FIG. 8) which are maintained between two end pieces 19 assembled on one another by means of threaded tie-rods 20, which are introduced in the opening of the rings 17. One of the two end pieces 19 has an axial channel 19a hollowed out therein, in the outer opening of which is screwed a lubricator of conventional type.

Figure 3:
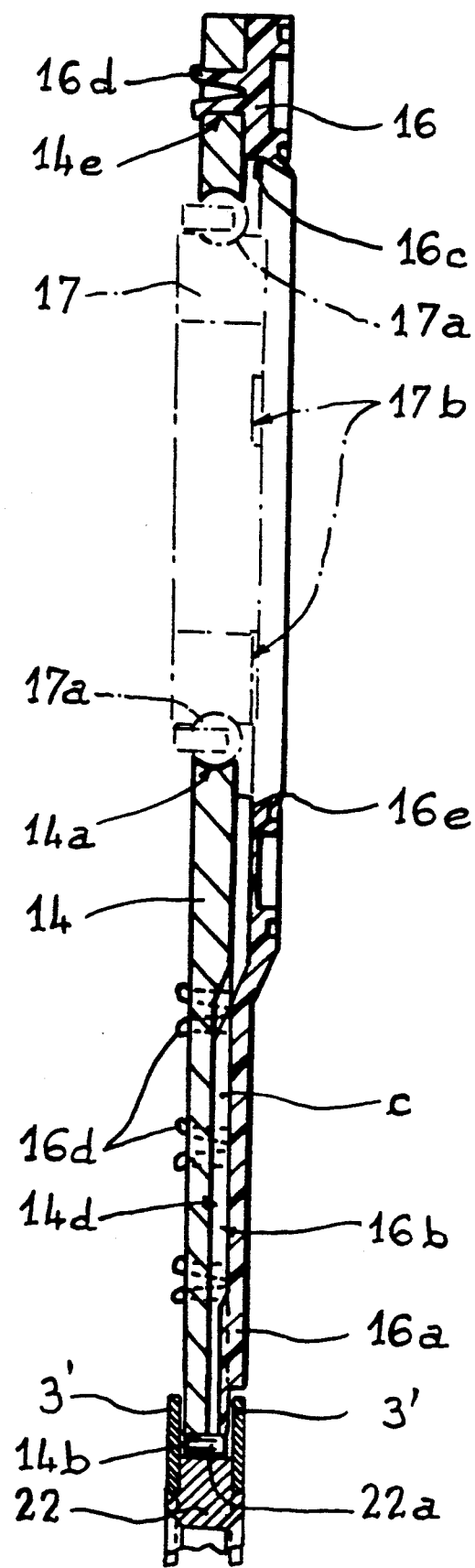
Figure 8:
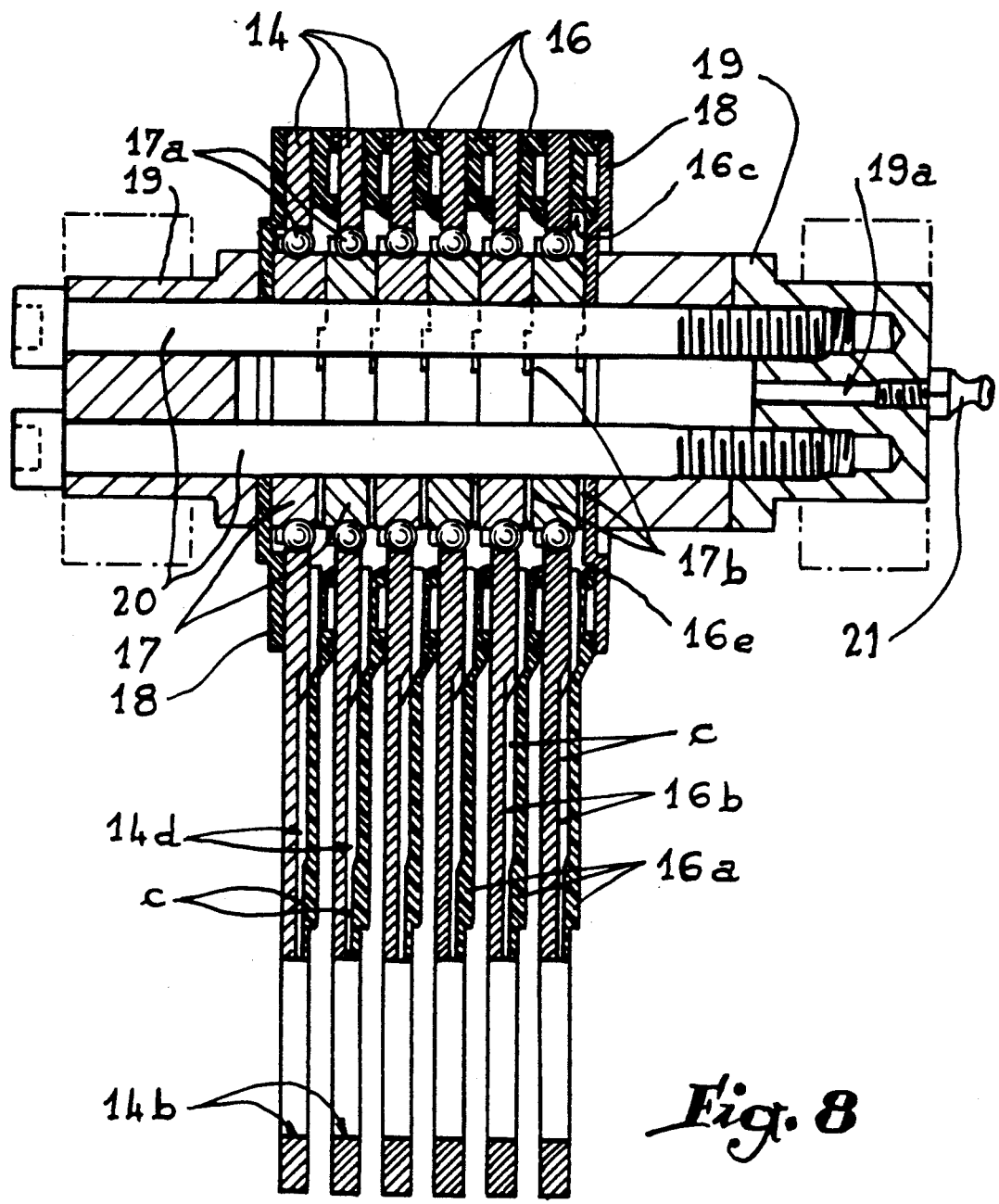
FIG. 8 is an axial section illustrating the assembly of a series of levers equipped with lateral elements.

It will be readily understood that this structure corresponds in fact to that of a hollow shaft whose inner space, defined by the openings of rings 17, is capable of being filled with lubricant. The lubricant may traverse the radial notches 17b to the opening of the conduit c mentioned above and, from there, up to the opening 14b of each lever 14 to ensure lubrication of the pivot intended for coupling the corresponding connecting rod 3. It will be observed that the extension 16a of the lateral element 16 and the impression 14d are profiled so that the end of conduit c opens out directly against the rolling bodies 22a of the roller bearing 22 ensuring pivoting assembly of the connecting rod 3 shown, between the two parallel plates 3' which form the connecting rod, as illustrated in FIG. 3.

Lubrication is thus effected under excellent conditions up to the desired point. The inner space defined by rings 17 between the end pieces 19 constitutes a reserve or reservoir of lubricant of which the volume may be calculated so as to reduce the frequency of the fillings, these operations being, in addition, capable of being easily effected through the lubricator 21 without having to stop the loom due to the fixed nature of the lubricator; moreover, it will be noted that filling may be effected automatically and continuously, by employing a centralized distribution.

It goes without saying that each lateral element 16 may include a plurality of extensions 16a oriented with respect to one another so as to define conduits c adapted to ensure lubrication of all the pivots for coupling the connecting rods 3 associated with the same lever 14. In the same way, the end of the extension 16a of at least certain of the lateral elements 16 and the impression 14d of the lever 14 are capable of presenting a Y profile in order to be in a position to lubricate the pivots provided side by side on the same arm of each lever (case of the left-hand rocking lever in the embodiment shown in FIG. 1).

Figure 11:
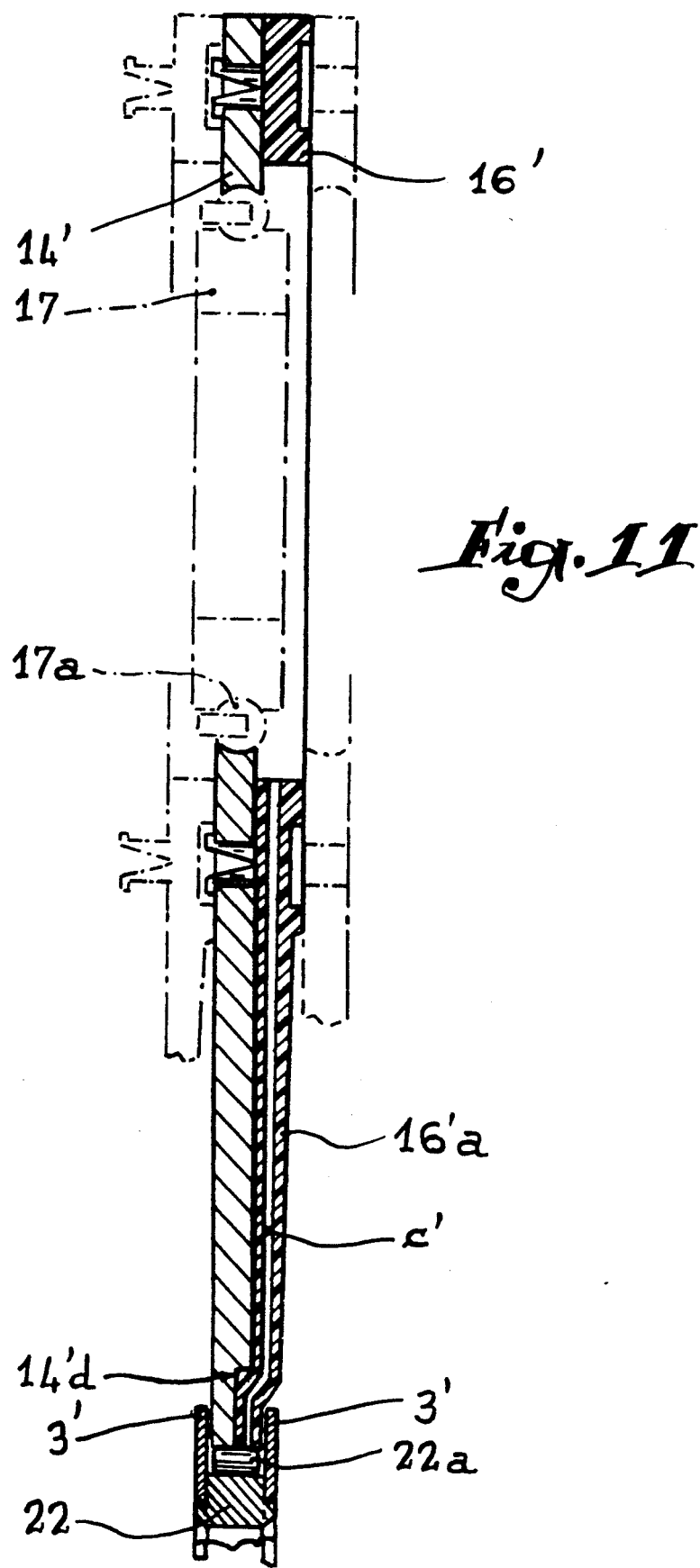

In the variant embodiment illustrated in FIGS. 9 to 11, each radial extension 16'a of the lateral elements 16' presents a closed transverse section so that the conduit c' is integrally defined therein. Once each lateral element 16 is fixed against the lateral wall of a lever 14', the free end, folded like a nose to ensure lubrication of the rolling bodies 22a of the roller bearing 22, engages in a depression 14'd of the lever, while the annular part of the lateral element constitutes, with the adjacent level 14', a tight chamber which communicates with the reserve of lubricant made between the tie-rods 20.

It will be observed that, in place of these tie-rods, a solid shaft may be employed for assembling the mobile complexes 14–16 or 14'–16', the reserve of lubricant in that case being constituted by the free space of the annular parts of the lateral elements 16 or 16' which communicate together through the cages of the roller bearings 17–17a. It will be noted, in addition, that the lateral walls of the lateral elements 16 or 16' are advantageously provided with deformable sealing lips of the type shown at 16e in FIG. 3; these lips are adapted, by crushing, to avoid any leakage of lubricant out of the central reserve and the conduits c.

It must, moreover, be understood that the foregoing description has been given only by way of example and that it in no way limits the domain of the invention which would not be exceeded by replacing the details of execution described by any equivalents.

What is claimed is:

1. In a drawing mechanism interposed between a weaving mechanism and heddle frames mounted on a weaving loom, and which includes connecting rods coupled to one another with rocking levers, the rocking levers including a center opening by way of which the levers are mounted by bearings to a pivot shaft, and at least one extension arm having an opening therein through which a connecting rod extends, the improvement comprising; at least one of the rocking levers having a lateral element including a principal portion which surrounds the pivot shaft center opening and between which lubricant is retained, and at least one lubricating conduit extending from said principal portion to said opening of said at least one extension arm.

2. The mechanism of claim 1, wherein said lateral element includes at least one radial extension extending from said principal portion along which said at least one lubricating conduit extends.

3. The mechanism of claim 2, where said lubricating conduit is defined by an impression made in said at least one extension arm and an impression in said radial extension of said lateral element.

4. The mechanism of claim 3, including roller bearings surrounding the connecting rod extending within the opening in the at least one extension arm, said at least one lubricating conduit opening to said roller bearings.

5. The mechanism of claim 3, wherein said lateral element includes at least one sealing lip on said principal portion.

6. The mechanism of claim 2, wherein said at least one lubricating conduit is integrally defined inside the radial extension of said lateral element.

7. The mechanism of claim 1, including a plurality of rocking levers mounted to the pivot shaft, a side-by-side assembly of rings of a plurality of roller bearings engaged in the center opening of the levers, and said rings assembled to one another by threaded tie-rods.

8. The mechanism of claim 7, wherein said rings are clamped between two end pieces of which at least one has a channel therein, and lubricator means for introducing lubricant intermediate said rings.

9. The mechanism of claim 1, wherein the rocking lever has holes therein and said lateral element includes studs adapted to be fixed in said holes to ensure assembly of said lateral element with the rocking lever.

10. The mechanism of claim 9, wherein said studs are split in order to elastically lock in said holes.

11. The mechanism of claim 1 including bearing means surrounding the connecting rod extending within the opening in the at least one extension arm, said lateral element including a radial extension through which said at least one lubricating conduit extends, the rocking lever having a depression adjacent the opening in the at least one extension arm, said radial extension including an outlet nose portion extending into said depression so as to communicate said at least one lubricating conduit with said bearing means.

* * * * *